(12) United States Patent
Blair et al.

(10) Patent No.: US 7,177,712 B2
(45) Date of Patent: Feb. 13, 2007

(54) PROGRAMMABLE LAUNDRY APPLIANCE

(75) Inventors: Jeffrey L. Blair, Newton, IA (US); Kim L. Wright, Newton, IA (US); Dennis C. Mundt, Cedarburg, WI (US)

(73) Assignee: Maytag Corporation, Newton, IA (US)

( * ) Notice: Subject to any disclaimer, the term of this patent is extended or adjusted under 35 U.S.C. 154(b) by 926 days.

(21) Appl. No.: 09/740,977

(22) Filed: Dec. 21, 2000
(Under 37 CFR 1.47)

(65) Prior Publication Data

US 2002/0128729 A1 Sep. 12, 2002

(51) Int. Cl.
*G05B 15/00* (2006.01)

(52) U.S. Cl. ..................................................... 700/83
(58) Field of Classification Search .................. 700/83, 700/52, 17, 19
See application file for complete search history.

(56) References Cited

U.S. PATENT DOCUMENTS

| 3,477,258 A | 11/1969 | Walker et al. |
|---|---|---|
| 3,790,815 A | 2/1974 | Karklys |
| 3,922,889 A | 12/1975 | Karklys |
| 3,937,981 A | 2/1976 | Nystuen et al. |
| 4,084,237 A * | 4/1978 | Beachem et al. ............. 700/90 |
| 4,418,398 A | 11/1983 | Hornung |
| 4,449,384 A | 5/1984 | Jones |
| 4,856,301 A | 8/1989 | Broadbent |
| 4,977,394 A * | 12/1990 | Manson et al. ............. 340/679 |
| 5,150,489 A | 9/1992 | Kaji et al. |
| 5,279,134 A * | 1/1994 | Nonogaki et al. ......... 68/12.27 |
| 5,386,362 A | 1/1995 | Keret |
| 5,560,060 A | 10/1996 | Dausch et al. |
| 5,585,704 A * | 12/1996 | Elzind ........................ 318/446 |
| 5,619,614 A | 4/1997 | Payne et al. |

* cited by examiner

*Primary Examiner*—Thomas Pham
(74) *Attorney, Agent, or Firm*—Diederiks & Whitelaw, PLC

(57) ABSTRACT

A laundry machine control system and method of operating the same are disclosed. The system includes various slates of cycles pre-programmed into a CPU which controls the machine. Each of the slates includes numerous different cycles, each preferably designed to clean a different type of fabric. Particularly, each of the slates is programmed with the cycles expected to be used in a specific environment. The system of this invention allows for a programmer to select a desired slate from among the pre-programmed slates. It is also possible to reprogram a slate with cycles not originally part of that slate. Furthermore, it is possible, through the control system of the invention, to redefine a specific cycle including the individual steps and operations thereof.

17 Claims, 11 Drawing Sheets

PROGRAMMABLE LAUNDRY APPLIANCE

BACKGROUND OF THE INVENTION

1. Field of the Invention

The present invention is directed to an apparatus and method for programming and controlling the operation of a washing machine. The washing machine is provided with a set of pre-programmed slates, each including a number of different cycles. Each slate is specifically designed for use in a particular environment, for optimal cleaning of a specific type of fabric used in that environment. Although the system is installed with a specific slate, the system is designed to allow for the use of additional slates. Additionally, the individual cycles present in a slate may be selected from among all of the cycles present in all of the slates. Furthermore, the specific parameters and functions of each cycle may be re-programmed on site.

2. Discussion of the Prior Art

Automatic commercial washing machines have traditionally been operated from stored programs selected through manually actuated buttons or knobs. There is known in the art of washing machines a large number of electronic control systems which arrive from the factory with a variety of settings. These settings often include wash temperatures and time settings for various operations performed by the washing machine. Commonly present in modern washing machines are settings which optimally clean different fabrics. Depending upon the type of fabric chosen, the settings direct the various operations of the washing machine. It is also known in the art to provide on-premise laundry systems with pre-programmed operational cycles. Frequently, these pre-programmed operational cycles are organized into a series of slates which gives a user a number of different cycles from which to choose.

Because the cycles are pre-programmed at the factory, each machine is specifically designed for a particular environment. Typically, a machine will be pre-programmed with cycles relating to the types of fabric usually found in that environment. For example, a machine may be programmed with a slate directed to the fabrics found in a hotel, hospital, restaurant, or health club. Because the types of soiled fabrics differ in each environment, each slate will be specifically tailored to the types of fabric used and typical stains found on the fabrics in that environment.

The machines come pre-installed with a specific slate of cycles. For example, if a machine is to be used in a hospital, the cycles from which the user may choose are pre-programmed to optimally clean the fabrics typically used in a hospital setting. If the machine were to be used in a health club, the cycles may differ because the typical fabrics and stains encountered in a health club differ from that of a typical hospital. Therefore, the various cycles available are preset at the factory or by the installer depending upon the expected location and use environment of the machine.

U.S. Pat. No. 5,585,704, to Elzind teaches incorporating a microprocessor based control system into a washing machine in order to allow the changing of cycles after installation. The system replaces the pre-existing manual operation push buttons with a module connected to an automatic controller. The controller includes a circuit which incorporates a series of manual push buttons. Through the manual push buttons, the user is able to select between various wash programs. The controller also includes a removable and replaceable solid-state memory card which stores multiple wash programs. These memory cards, once inserted into a memory card drive present on the machine, provide multiple wash programs to the machine, allowing the archiving and up loading of various wash programs. Although the system allows the change of the various programmed wash cycles, the selection of wash cycles is limited to those present on the memory cards. Additionally, such as system requires external peripherals to add additional settings.

In any event, users are limited to the current slate programmed into the machine. Although it may be possible to load other cycles into the machine, it is difficult to change each of the cycles for optimal use in another environment. Additionally, a new slate of cycles cannot be easily loaded into the machine. Furthermore, with conventional washing machines, changing the individual parameters, other than a single wash cycle, is difficult at best.

SUMMARY OF THE INVENTION

The present invention is particularly directed to an apparatus and method for programming various slates and cycles of a washing machine. Generally, the present invention allows the editing of programs present in memory of the washing machine. The machine comes pre-programmed from the factory with different slates, each designed for use in a particular environment, with varying cycles programmed therein. The combination of cycles chosen for each slate relates to the expected requirements of use in each of the environments.

The washing machine of the invention is provided with a display and a series of buttons, forming a keypad, for selecting a desired cycle. Simply pressing one of the buttons starts the cycle selected. Because the washing machine comes pre-programmed with numerous slates and a selected slate for the expected environment, the washing machine therefore comes installed ready for use. If, however the user wishes to choose a different slate, this can be accomplished through the display and keypad. This allows the complete replacement of each of the cycles available.

In other situations, the user may wish to keep a majority of cycles present in the current slate, but replace others. It is possible in accordance with the invention to select cycles present in other slates, and place them in the current slate. By doing so, the user is granted a much larger degree of variability of the cycles available for use. Additionally, the user is given the ability to pick and choose cycles from the different slates pre-programmed into the washing machine to build a new slate. This allows a complete reprogramming of the current selected slate. Although the text associated with each of the buttons does not change, the assigned function does.

Each cycle comes pre-programmed from the factory with set parameters and operations. The parameters include, but are not limited to, cycle duration and temperatures, while the operations include, for example, dispensing and spinning modes. However, the user is not restricted to the pre-programmed parameters and operations. Through the buttons and display, it is possible to edit the pre-programmed parameters and operations of each cycle. Thus, each cycle may be completely rewritten with new commands.

Based on the above, it is possible to edit the currently available slate of cycles of a washing machine in accordance with the invention by (1) selecting an entirely different slate from among other available slates that have been pre-programmed into the machine; (2) editing the current slate by replacing one or more of the pre-programmed cycles in the current slate with cycles in other pre-programmed slates; or (3) editing the individual parameters and operations of one or more cycles of a slate to create cycles not present in any of the pre-programmed slates, thereby creating an original cycle to be used in the current slate.

In general, the invention represents an extremely versatile programming arrangement which allows system customization on a variety of levels. Additional objects, features and advantages of the invention will become more readily apparent from the following detailed description of a preferred embodiment thereof, when taken in conjunction with the drawings.

DETAILED DESCRIPTION OF THE PREFERRED EMBODIMENTS

Figure 1:
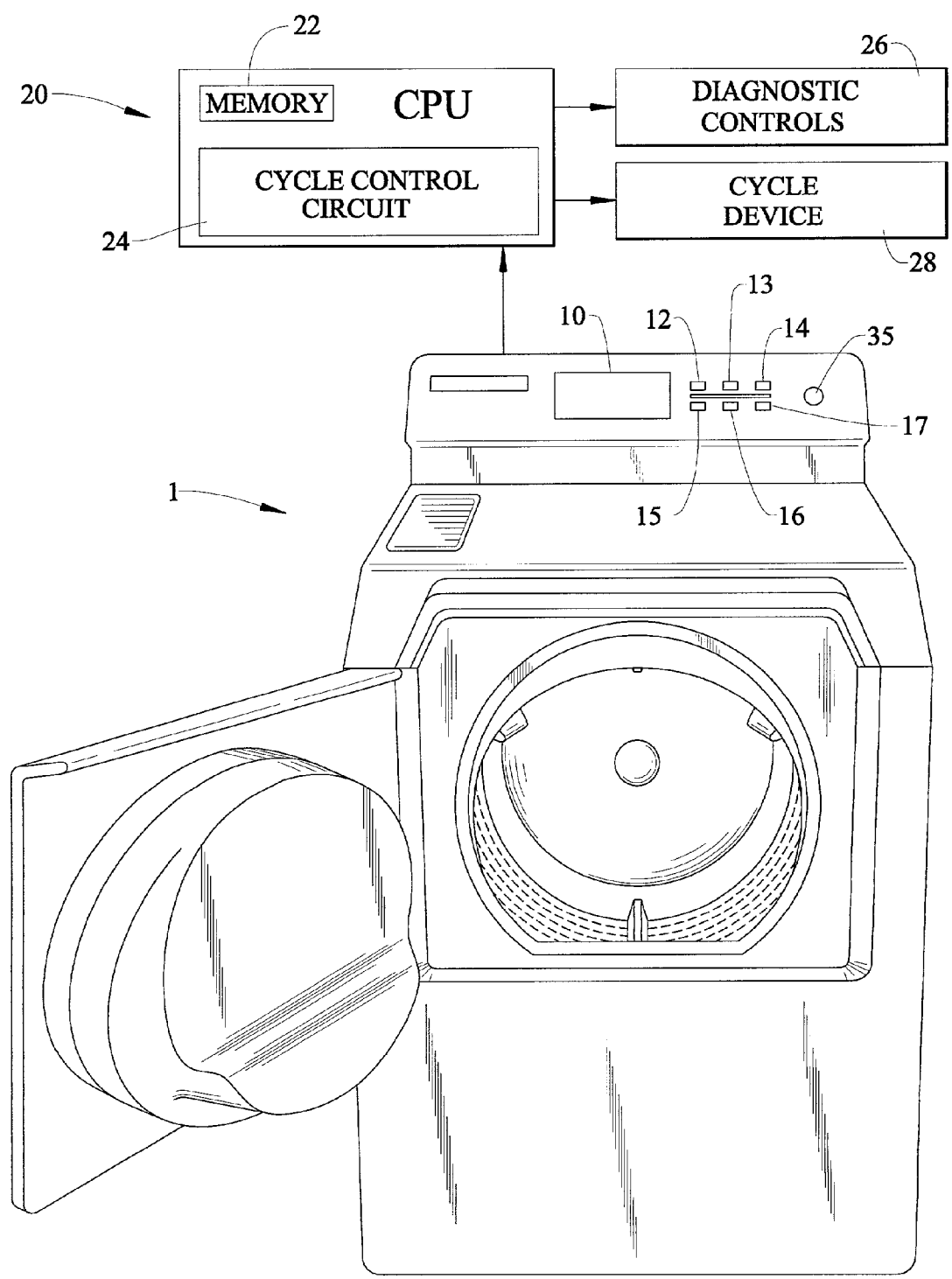
FIG. 1 depicts a washing machine including a programmable control system constructed in accordance with the invention.

With initial reference to FIG. 1, a washing machine 1 is illustrated to include a display 10, as well as various buttons 12–17 forming a keypad. Buttons 12–17 are used with display 10 to operate washing machine 1. Additionally, washing machine 1 includes a CPU 20. CPU 20 includes memory 22 and a cycle control circuit 24. CPU 20 is used to direct a set of diagnostic controls 26 and regulate a cycle device 28. Cycle device 28 includes control circuitry which specifically manages the individual operations of washing machine 1. Diagnostic controls 26 are used with CPU 20 to test the individual mechanics of washing machine 1 so as to ensure proper operation, and will be discussed in detail below. A key 35 is also provided through which the programmable features of washing machine 1 are accessed. Optionally, key 35 may be replaced by any other security device which limits access to the programmable features, such as a numeric keypad or insertable keycard.

Display 10 is used by a consumer during a customer mode 50 of operation (see FIG. 2), as well as by a technician during programming. The display 10 generally indicates the operating status of washing machine 1. Additionally, as CPU 20 moves through the various programming modes, as will be discussed further with reference to FIGS. 2–8, display 10 changes to assist the programmer.

Figure 2:
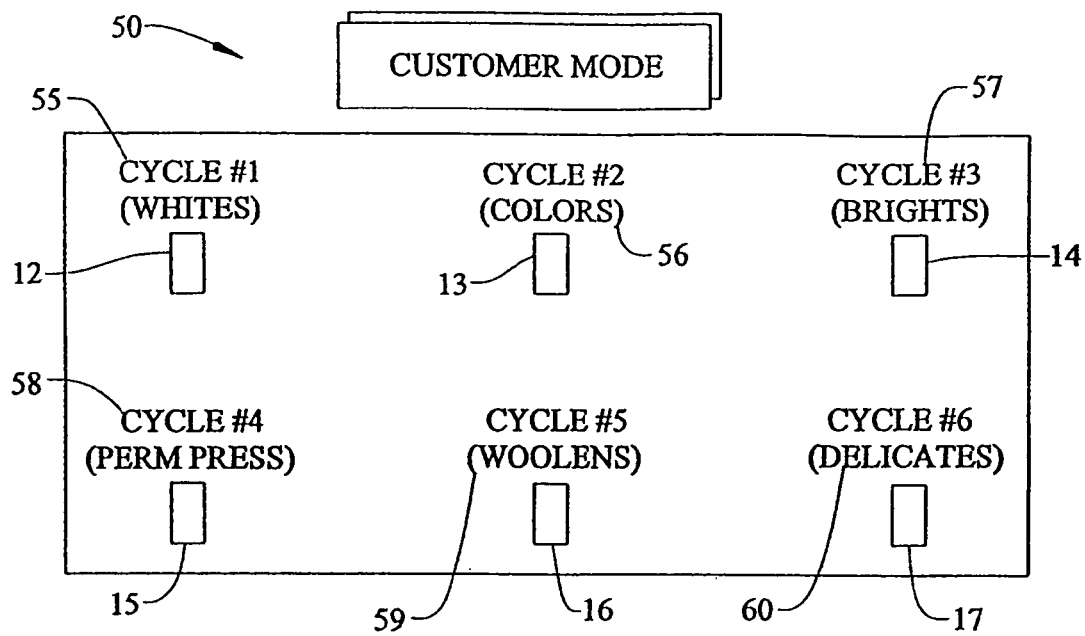
FIG. 2 depicts keypad buttons of the invention with associated functions when the control system is in a customer mode.

FIG. 2 illustrates buttons 12–17 and associated captions 55–60. Specifically, FIG. 2 depicts the functions of buttons 12–17 when washing machine 1 is in customer mode 50. Customer mode 50 is the status in which washing machine 1 is normally utilized. Each of the captions 55–60 is associated with individual buttons 12–17 and describes the cycle to be used when a specific button 12–17 is depressed. For example, when button 14 is depressed cycle no. 3 is activated to establish a bright colors cycle. Initially, it should be noted that captions 55–60 do not change in accordance with the preferred form of the invention, even though the pressing of buttons 12–17 may take on different programming functions as will become fully evident below.

Reference will now be made to FIGS. 3–8 in describing various, potential programming sequences in accordance with the invention. Upon activating the programming sequence of CPU 20 through key 35, an initial setup mode 61 is preferably presented to a programmer. By activating setup mode 61, the commands associated with buttons 12–17 change. In general, setup mode 61 is used by a programmer to gain access to CPU 20 to alter either the currently selected slate, cycle selection, or an individual cycle parameter.

Figure 3:
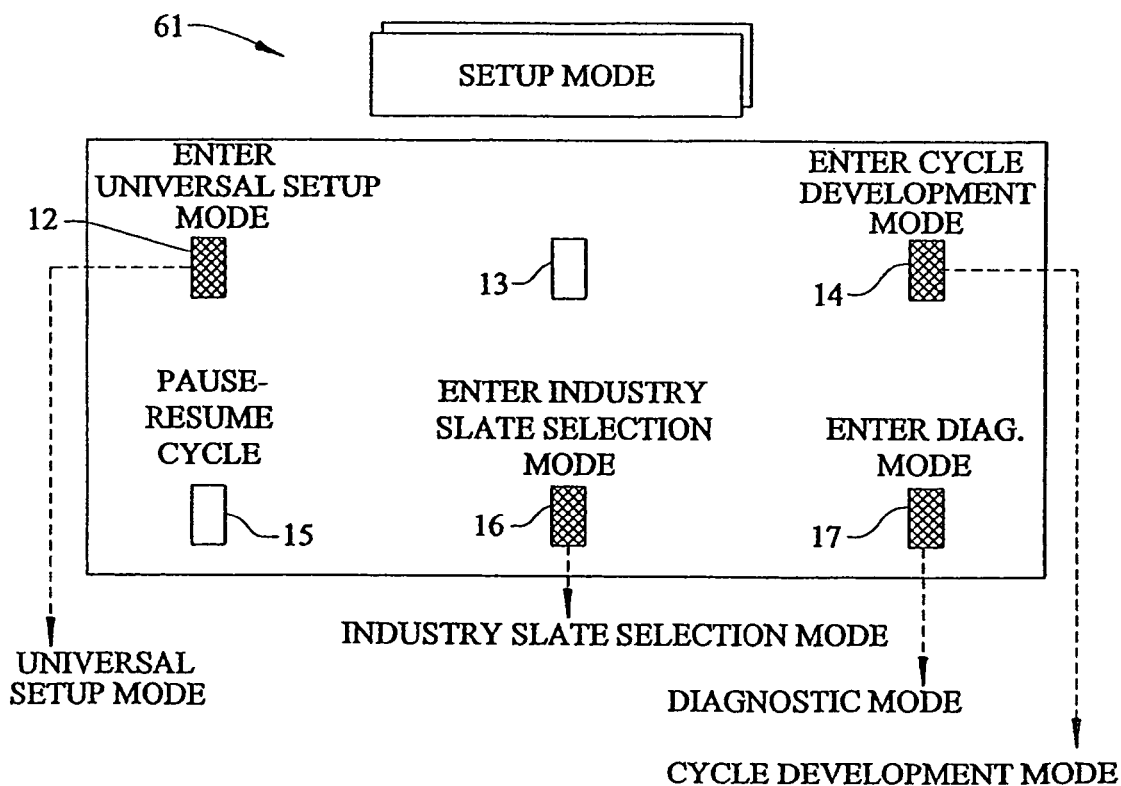
FIG. 3 depicts the keypad buttons of the invention with associated functions when the control system is in a setup mode.

FIG. 3 particularly illustrates a preferred configuration of setup mode 61. Once setup mode 61 is activated, the command array associated with buttons 12–17 automatically shifts to that shown in FIG. 3. The primary functiion of setup mode 61 is to give the programmer access to the various menus and commands used during programming of washing machine 1.

Figure 4A:
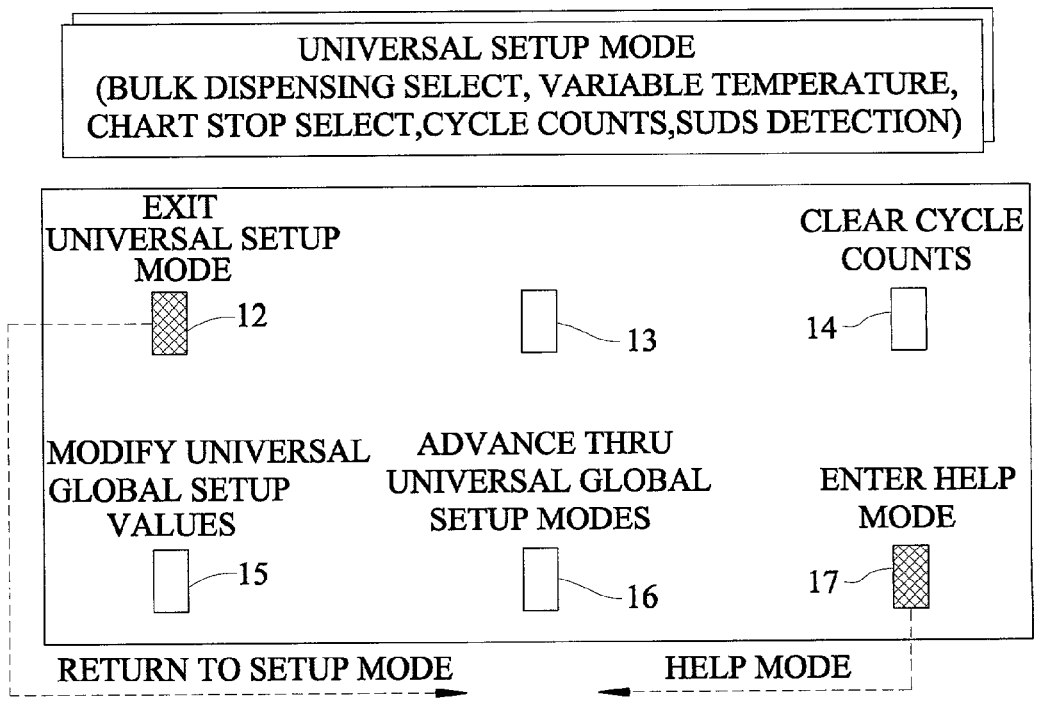
FIG. 4A shows the keypad buttons of the invention with associated functions when the control system is in a universal setup mode.

Universal setup mode 70 can be selected through button 12 and is preferably used to modify various options applicable to all of the cycles. The commands assigned to buttons 12–17 when in this mode are depicted in FIG. 4A. Again, the actual captions 55–60 preferably remain fixed even though FIGS. 3–8 illustrate different wording shown to aid in fully understanding the functions performed through buttons 12–17 in the various modes. Most preferably, display 10 provides symbolic, informational text related to the mode/functions selected. Of course, it should be realized that display 10 could define a touch screen incorporating zones for buttons 12–17 such that different captions could be presented. The options for established universal global setup values are selected by depressing button 16 and, once selected, modified by depressing button 15. Preferably, the universal global setup values relate to parameter used in each cycle These parameters include, but are not limited to, a bulk dispensing option that is required to be enabled before cycle development changes are allowed, variable cold temperature selection, variable warm temperature, suds detection, and chart stop selection (used to stall a cycle step when more than one washing machine 1 is connected to the same bulk dispensing or external supply). Additionally, button 12 returns CPU 20 to setup mode 61. Also accessible through button 16 are cycle counts, which simply display the total number of times each of the cycles has been activated since the counts were last cleared via button 14.

Figure 4B:
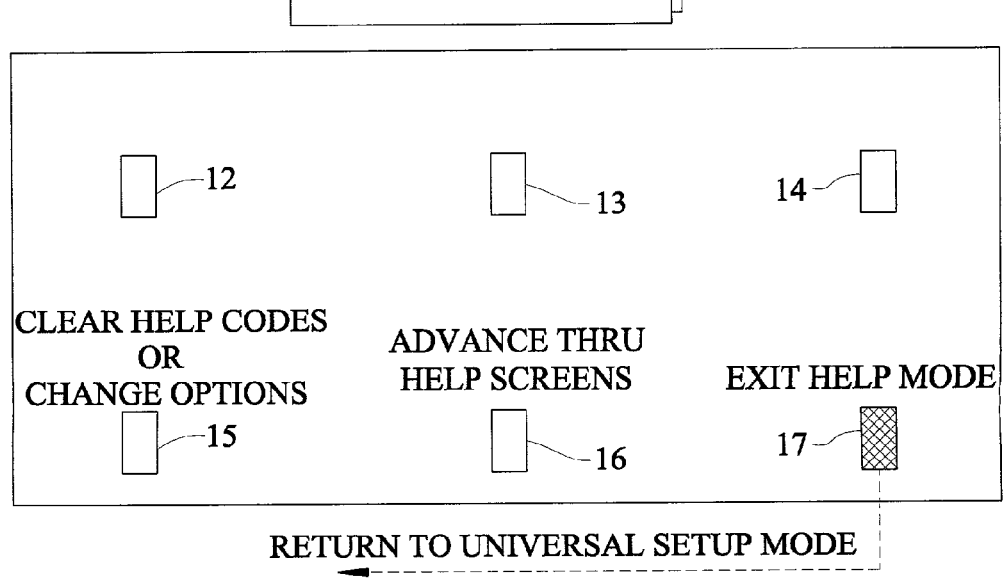
FIG. 4B shows the keypad buttons of the invention with associated functions when the control system is in a help mode.

When in universal setup mode 70, button 17 establishes a help mode 80, depicted in FIG. 4B. In help mode 80, button 16 can be preferably used to advance through help codes or screens pertaining to, for example, an extended fill option, software revision, spinner RPM, relative amount of power being requested of the motor, relative amount of unbalance in the system, and delay features. Button 15 is used either to clear a displayed help code or to select/deselect the various options. In help mode 80, other display symbols and elements may be shown on display 10 to indicate the state of various inputs and outputs including: low voltage, hot water relay on, door locked, detergent relay on, and chart stop input. In accordance with one embodiment of the invention, the following table illustrates the preferred words and elements shown on display 10, and descriptions thereof:

TABLE 1

| Display | Description |
| --- | --- |
| WASH | Water sensed at wash level |
| * | Low voltage present (below 90 VAC) |
| UNBALANCE | Redistributing due to out-of-balance |
| ○ (circle above digit) | Door sensed closed |
| DOOR LOCKED | Door sensed locked |
| COLD | Cold water relay on |
| HOT | Hot water relay on |
| OR | Door lock relay on |
| AVAILABLE | Drain relay on |
| ADD | Chart stop input sensed |
| DETERGENT | Detergent relay on |
| BLEACH | Bleach relay on |
| SOFTENER | Softener relay on |
| SOAK | Auxiliary relay on |
| RE | Recirculation pump relay on |

Figure 5A:
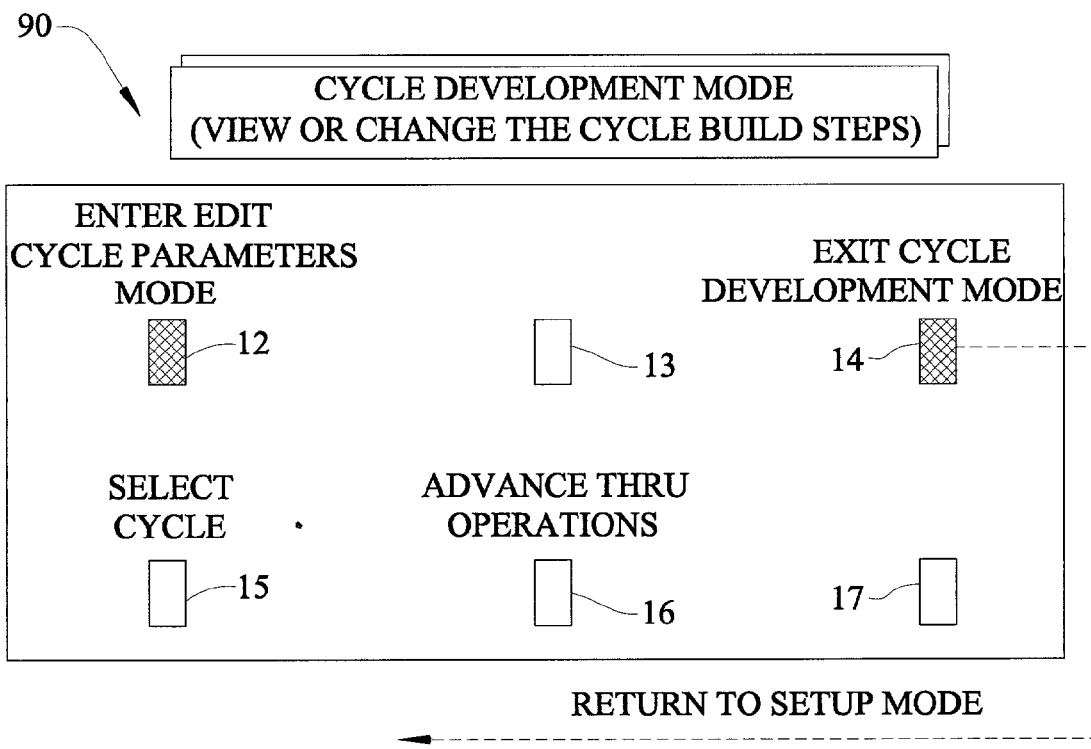
FIG. 5A depicts the keypad buttons of the invention with associated functions when the control system is in a cycle development mode.
Figure 5B:
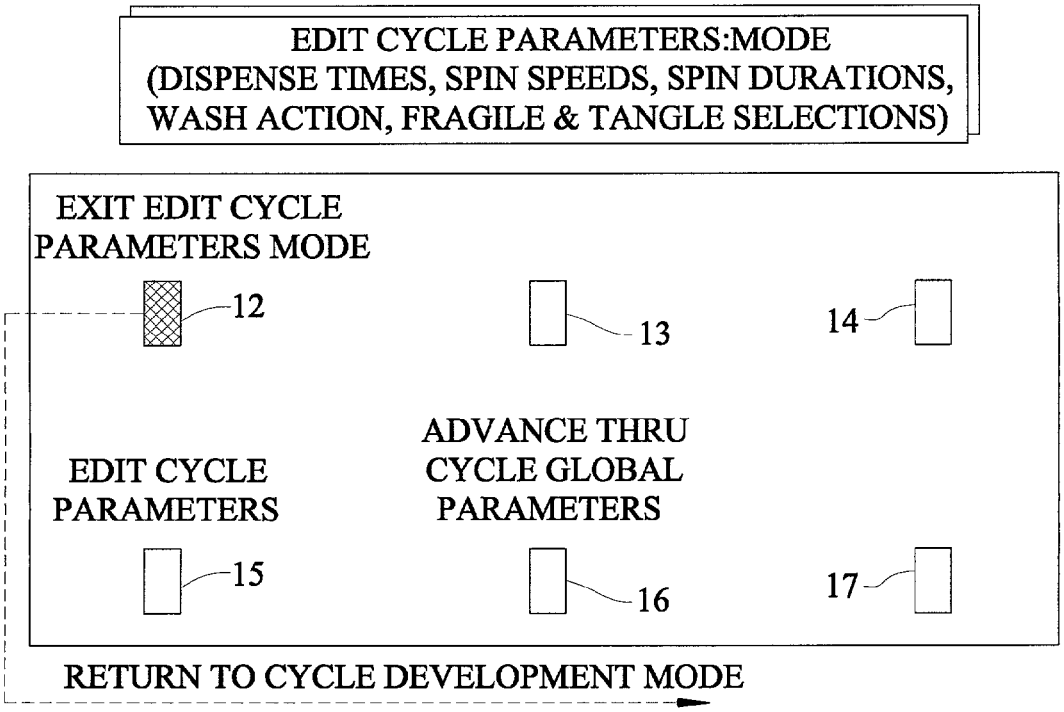
FIG. 5B depicts the keypad buttons of the invention with associated functions when the control system is in an edit cycle parameters mode.
Figure 5C:
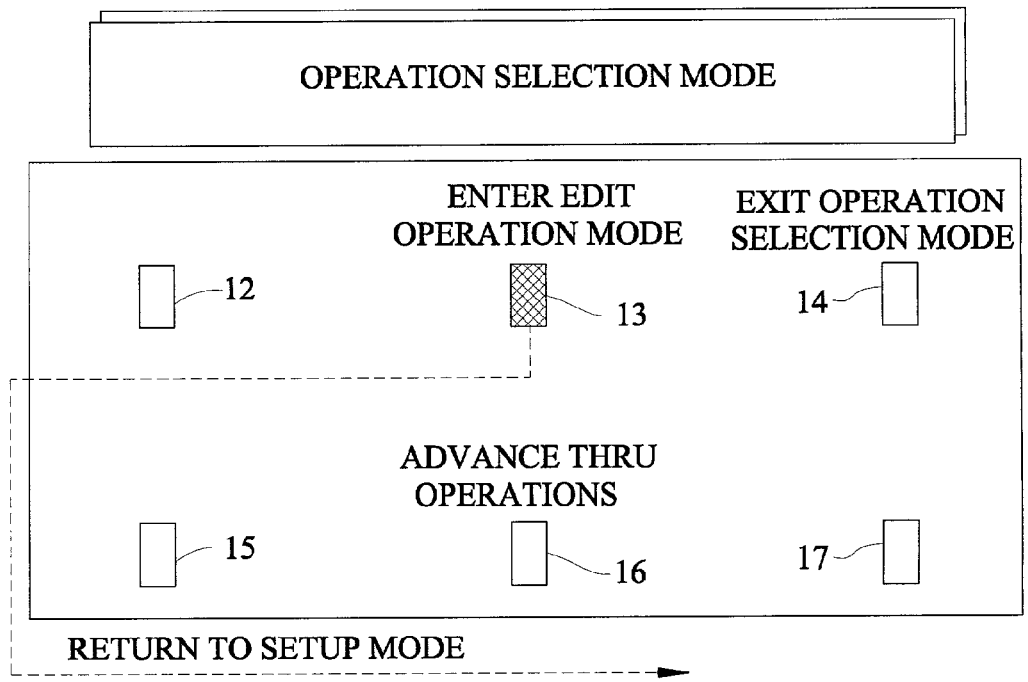
FIG. 5C depicts the keypad buttons of the invention with associated functions when the control system is in an operation selection mode.
Figure 5D:
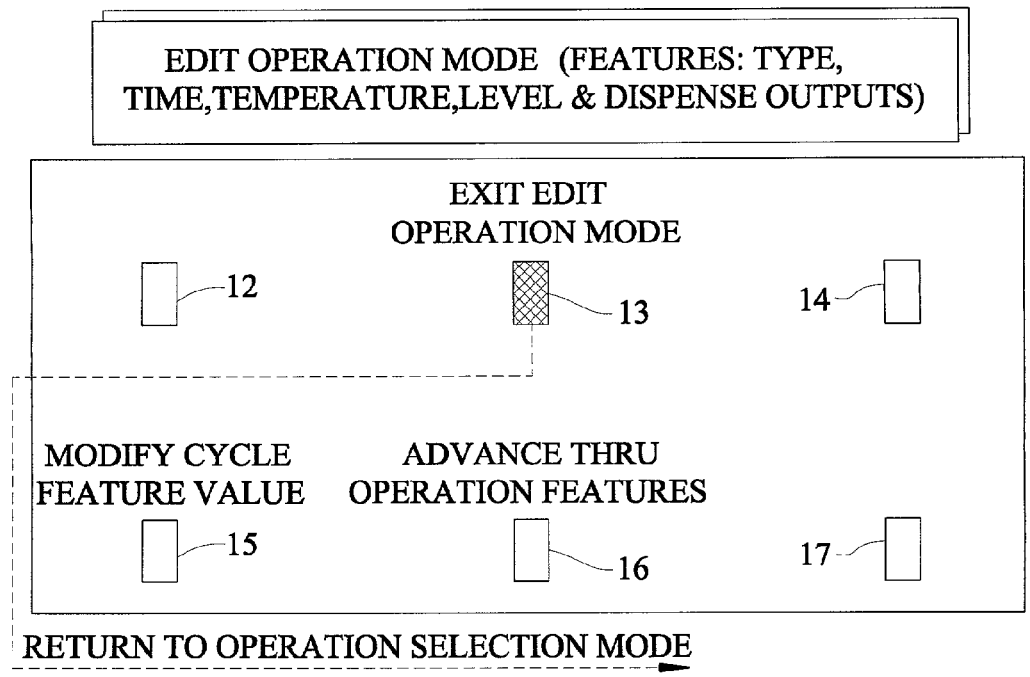
FIG. 5D depicts the keypad buttons of the invention with the associated functions when the control system is in an edit operation mode.

Also accessible from setup mode 61 is cycle development mode 90, shown in FIG. 5A, in which the individual operations of a cycle may be constructed. Cycle development mode 90 is accessed by pressing button 14 while in setup mode 61. First, a cycle must be chosen by the programmer, by pressing button 15 until the correct cycle number is shown on display 10. Pressing button 12 advances to edit cycle parameters mode 100, shown in FIG. 5B, in which specific cycle options may be selected. An operation selection mode 110, illustrated in FIG. 5C, is accessed by pressing button 16 while in cycle development mode 90. Operation selected mode 110 allows modification of various operations associated with the selected cycle.

The options which are preferably available for modification in edit cycle parameters mode 100 are selected via button 16. Pressing button 16 cycles through options including detergent, bleach, softener, or auxiliary dispense signal durations, reduced-tangle handling, amount of wash action, fragile-load handling, final extraction speed and time, and intermediate extraction speed and time. When one of the above-options is selected, pressing button 15 is used to change the activation state or operational parameter.

Operation selection mode 110 allows individual steps of a cycle to be amended, once a cycle has been chosen in cycle development mode 90. Repeatedly pressing button 16 sequences through the operations of the current cycle. Once the desired operation has been selected, pressing button 13 activates edit operation mode 120 (FIG. 5D) which allows the altering of the selected operation. Edit operation mode 120 allows the programmer to change the operation of the cycle step. Button 15 is used to select an operation type from among a list of pre-programmed options. Preferably, the list includes suds-bleach, suds, sour, sour-softener, starch, softener, break, treatment, bleach, flush, rinse 1, rinse 2, carry-over, intermediate extract, final extract, and no operation. Some of the listed options are associated with additional instructions such as tumble time, fill temperature, fill level, and dispensing, all of which accordingly have programmable values. The programmable values for the additional instructions are accessed by pressing button 16 and can then be modified by pressing button 15. Pressing button 13 returns CPU 20 to operation selection mode 110.

Figure 6A:
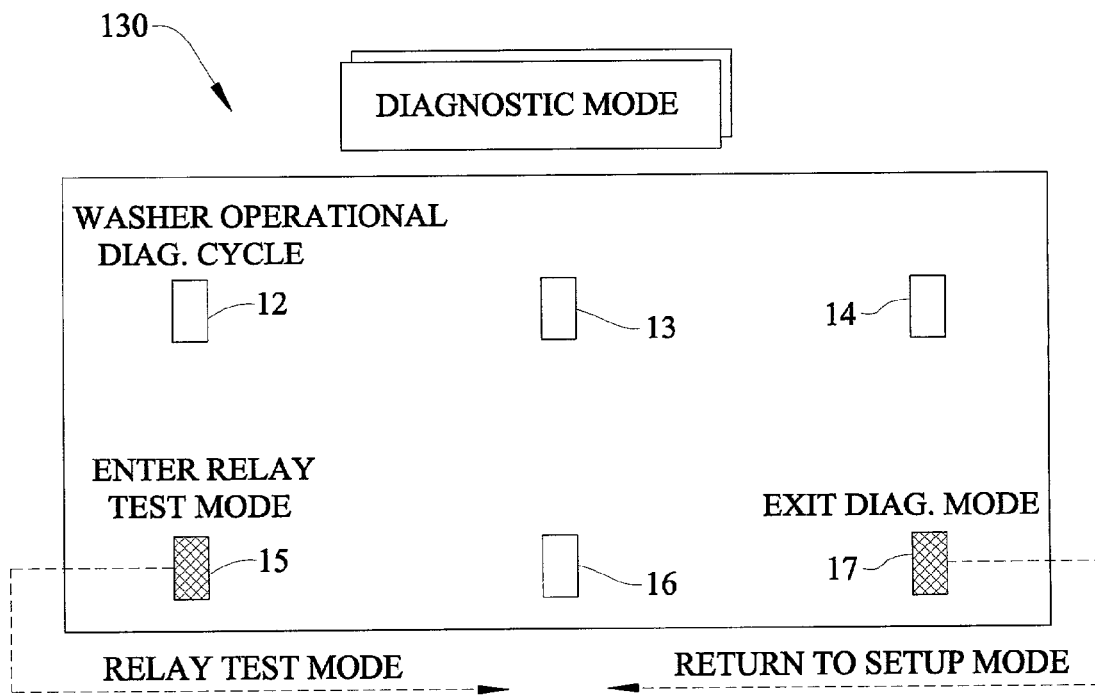
FIG. 6A depicts the keypad buttons of the invention with the associated functions when the control system is in a diagnostic mode.

CPU 20 of washing machine 1 additionally includes a diagnostics mode 130. Diagnostics mode 130, shown in FIG. 6A, is accessed by pressing and holding button 17 when in setup mode 61, and allows the programmer to perform a variety of diagnostic procedures on washing machine 1. Diagnostics mode 130 is also utilized when CPU 20 detects a problem with washing machine 1. On entry to diagnostics mode 130, display 10 flashes, and any running cycle will be canceled. If a problem persists, display 10 will show a diagnostics code which must be corrected before washing machine 1 may resume its normal function.

Figure 6B:
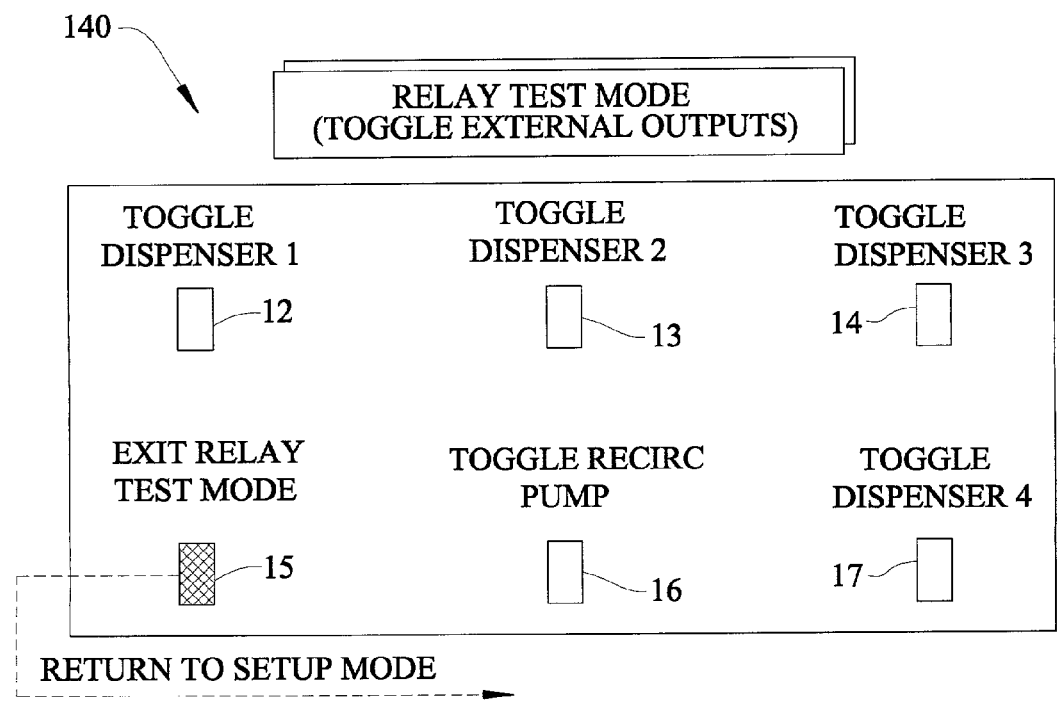
FIG. 6B depicts the keypad buttons of the invention with the associated functions when the control system is in a relay test mode.
Figure 8:
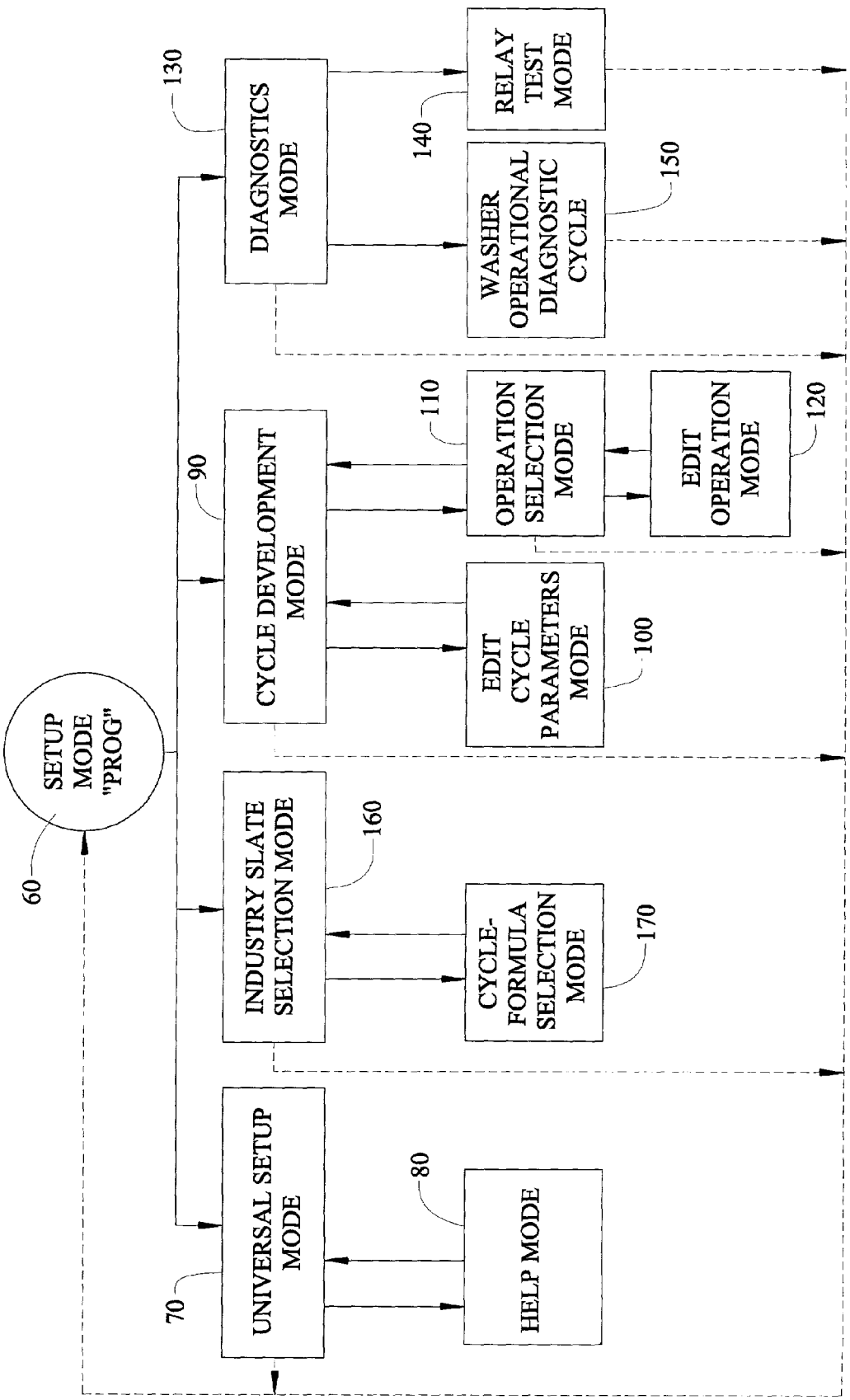
FIG. 8 is a diagrammatic flow-chart representing a menu of the control system of the invention.

Troubleshooting diagnostic errors is accomplished through a relay test mode 140, which is accessed by pressing button 15 when in diagnostics mode 130. This test mode provides a means for checking the external relay inputs. Pressing button 12–14, 16 or 17 once will toggle the respective relay output, which will be indicated on display 10. As shown in FIG. 6b, buttons 12–14, 16 and 17 each toggle a specific relay and dispenser. The various dispensers preferably include detergent, bleach and softener dispensers, as well as a recirculation pump relay. A washer operational diagnostic cycle 150 can also be selected by pressing button 12 during diagnostics mode 130. Washer operational diagnostic cycle 150 is indicated in FIG. 8, which also illustrates, in flow chart form, the overall program scheme stemming from setup mode 61. In general, washer operational diagnostic cycle 150 runs a cycle with more typical full length fills, tumbles, drains and dispenser operation sequences, thereby allowing for a more thorough analysis of machine operation, including pressure switch behavior.

The description of the invention to this point has been essentially provided for the sake of completeness. In general, the invention is particularly directed to enabling a laundry machine to be programmed on various different levels as will be detailed hereinafter. When washing machine 1 is installed, the programmer either accepts a default slate or chooses a new slate, depending upon the expected use of washing machine 1. For example, a food service establishment generally requires a different slate of cycles from those required by a health club. Preferably, washing machine 1 is pre-programmed with a variety of industry slates, each designed for a specific industry: general use, hotels and motels with food service, hotels and motels without food service, health care with food service, health care without food service, general food service, fast food service, athletic club or beauty salon, and shirt laundry. The cycles of the pre-programmed slates have been chosen at the factory based on the expected needs at each of the above laundry facilities. Through buttons 12–17, one of the pre-programmed cycles of the selected slate is activated. The following tables illustrate a preferred combination of pre-programmed slates, along with their cycles, which may be chosen by the programmer upon installation of washing machine 1:

TABLE 2

Slate 1: General (default)

| Keypad Button | Cycle No. | Description of Cycle |
|---|---|---|
| Whites | 28 | Hot Water Wash |
| Colors | 29 | Warm Water Wash |
| Bright Colors | 30 | Cold Water Wash |
| Permanent Press | 31 | Warm Water Wash |
| Woolens | 32 | Cold Water Wash |
| Delicates & Knits | 33 | Warm Water Wash |

TABLE 3

Slate 2: Hotel and Motel with Food Service

| Keypad Button | Cycle No. | Description of Cycle |
|---|---|---|
| Whites | 2 | White Sheets |
| Colors | 8 | Cotton or Blended Table Linen |
| Bright Colors | 10 | 100% Polyester Colored Table Linen |
| Permanent Press | 5 | Delicate |
| Woolens | 4 | Rags and Mops |
| Delicates & Knits | 6 | Stain Treatment |

TABLE 4

Slate 3: Hotel and Motel without Food Service

| Keypad Button | Cycle No. | Description of Cycle |
|---|---|---|
| Whites | 1 | White Sheets |
| Colors | 2 | White Towels |
| Bright Colors | 3 | Combination Formula Whites, Colored Sheets & Towels |
| Permanent Press | 4 | Rags and Mops |
| Woolens | 5 | Delicate |
| Delicates & Knits | 6 | Stain Treatment |

TABLE 5

Slate 4: Health Care with Food Service

| Keypad Button | Cycle No. | Description of Cycle |
|---|---|---|
| Whites | 11 | Health Care Sheets and Towels |
| Colors | 8 | Cotton or Blended Colored Table Linen |
| Bright Colors | 5 | Delicate |
| Permanent Press | 6 | Stain Treatment |
| Woolens | 4 | Rags and Mops |
| Delicates & Knits | 10 | 100% Polyester Colored Table Linen |

TABLE 6

Slate 5: Health Care Without Food Service

| Keypad Button | Cycle No. | Description of Cycle |
|---|---|---|
| Whites | 11 | Health Care Sheets and Towels |
| Colors | 12 | Diapers |
| Bright Colors | 5 | Delicate |
| Permanent Press | 6 | Stain Treatment |

TABLE 6-continued

Slate 5: Health Care Without Food Service

| Keypad Button | Cycle No. | Description of Cycle |
|---|---|---|
| Woolens | 4 | Rags and Mops |
| Delicates & Knits | 13 | Health Care Light Soil Sheets and Towels |

TABLE 7

Slate 6: Food Service

| Keypad Button | Cycle No. | Description of Cycle |
|---|---|---|
| Whites | 7 | Cotton or Blended White Table Linen |
| Colors | 8 | Cotton or Blended Colored Table Linen |
| Bright Colors | 9 | 100% Polyester White Table Linen |
| Permanent Press | 10 | 100% Polyester Colored Table Linen |
| Woolens | 4 | Rags and Mops |
| Delicates & Knits | 6 | Stain Treatment |

TABLE 8

Slate 7: Fast Food Service

| Keypad Button | Cycle No. | Description of Cycle |
|---|---|---|
| Whites | 14 | Fast Food Medium Towels |
| Colors | 15 | Fast Food Heavy Towels |
| Bright Colors | 16 | Fast Food Medium Soil Uniforms |
| Permanent Press | 17 | Fast Food Heavy Soil Uniforms |
| Woolens | 4 | Rags and Mops |
| Delicates & Knits | 6 | Stain Treatment |

TABLE 9

Slate 8: Athletic, Health Club, and Beauty Salon

| Keypad Button | Cycle No. | Description of Cycle |
|---|---|---|
| Whites | 18 | Light to Medium Soil Sport Uniforms, Gym Clothes, and Towels |
| Colors | 19 | Heavy Soil Baseball, Football, and Soccer |
| Bright Colors | 20 | Cold Wash, No Bleach Basketball and Delicates |
| Permanent Press | 4 | Rags and Mops |
| Woolens | 6 | Stain Treatment |
| Delicates & Knits | 21 | Towels with Hair |

TABLE 10

Slate 9: Shirt Laundry

| Keypad Button | Cycle No. | Description of Cycle |
|---|---|---|
| Whites | 22 | Hot Wash Shirts |
| Colors | 23 | Warm Wash Shirts |
| Bright Colors | 24 | Cold Wash Shirts |
| Permanent Press | 25 | Shirts - Starch Only |
| Woolens | 26 | Hot Wash Shirts - With Starch |
| Delicates & Knits | 27 | Warm Wash Shirts - With Starch |

Figure 7A:
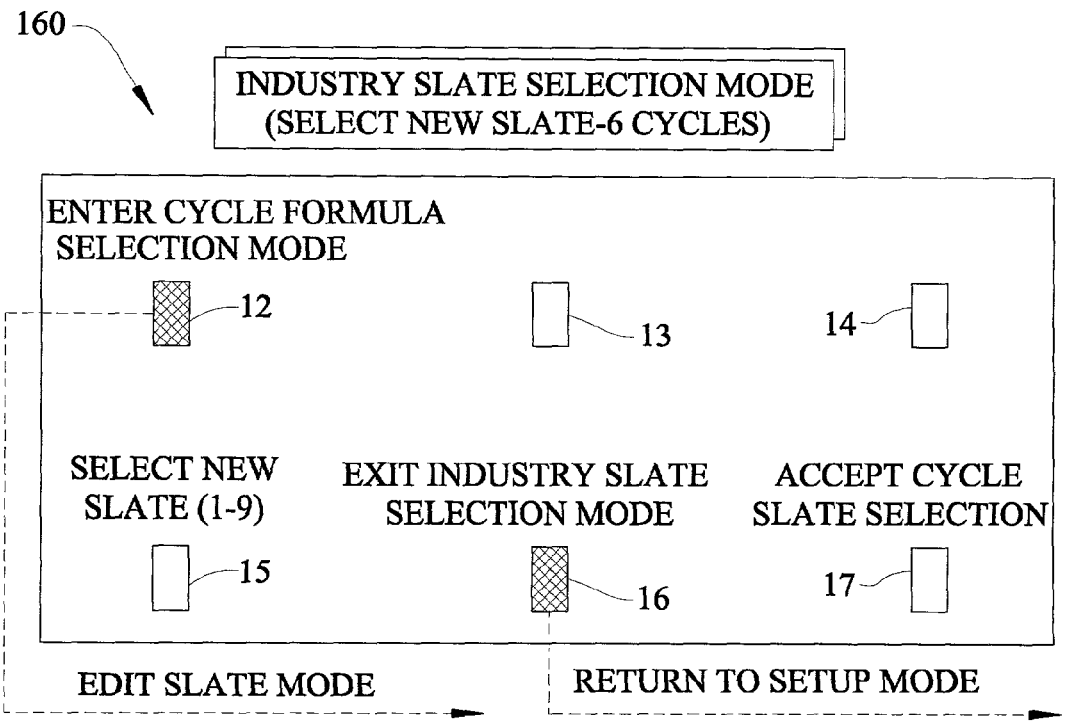
FIG. 7A depicts the keypad buttons of the invention with the associated functions when the control system is in an industry slate selection mode.
Figure 7B:
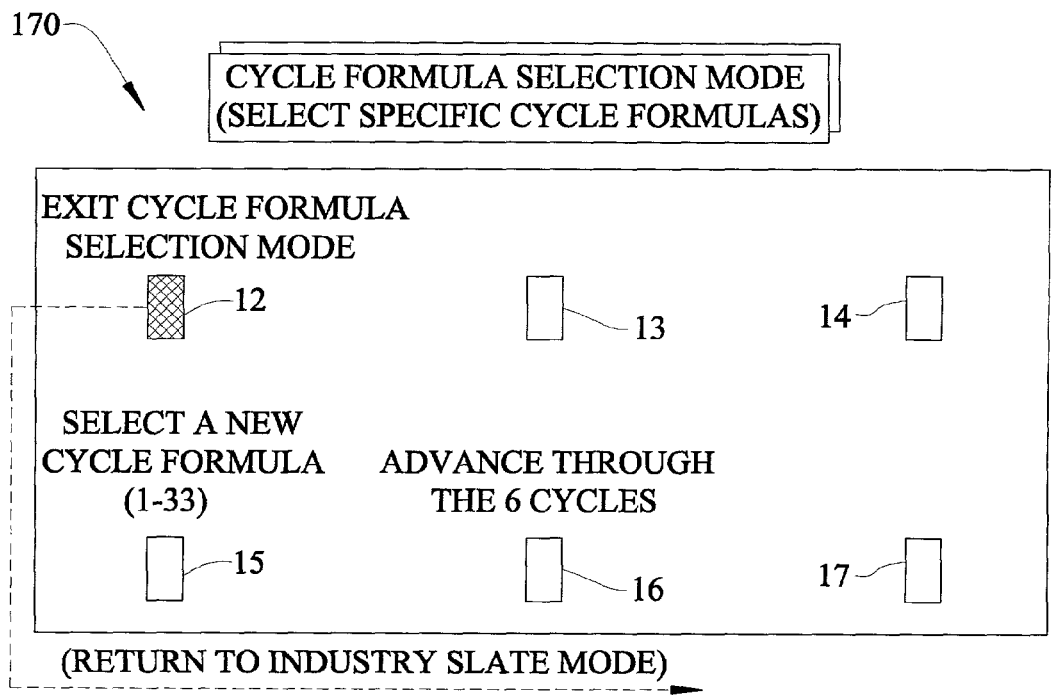
FIG. 7B shows the keypad buttons of the invention with associated functions when the control system is in a cycle-formula selection mode.
Figure 9:
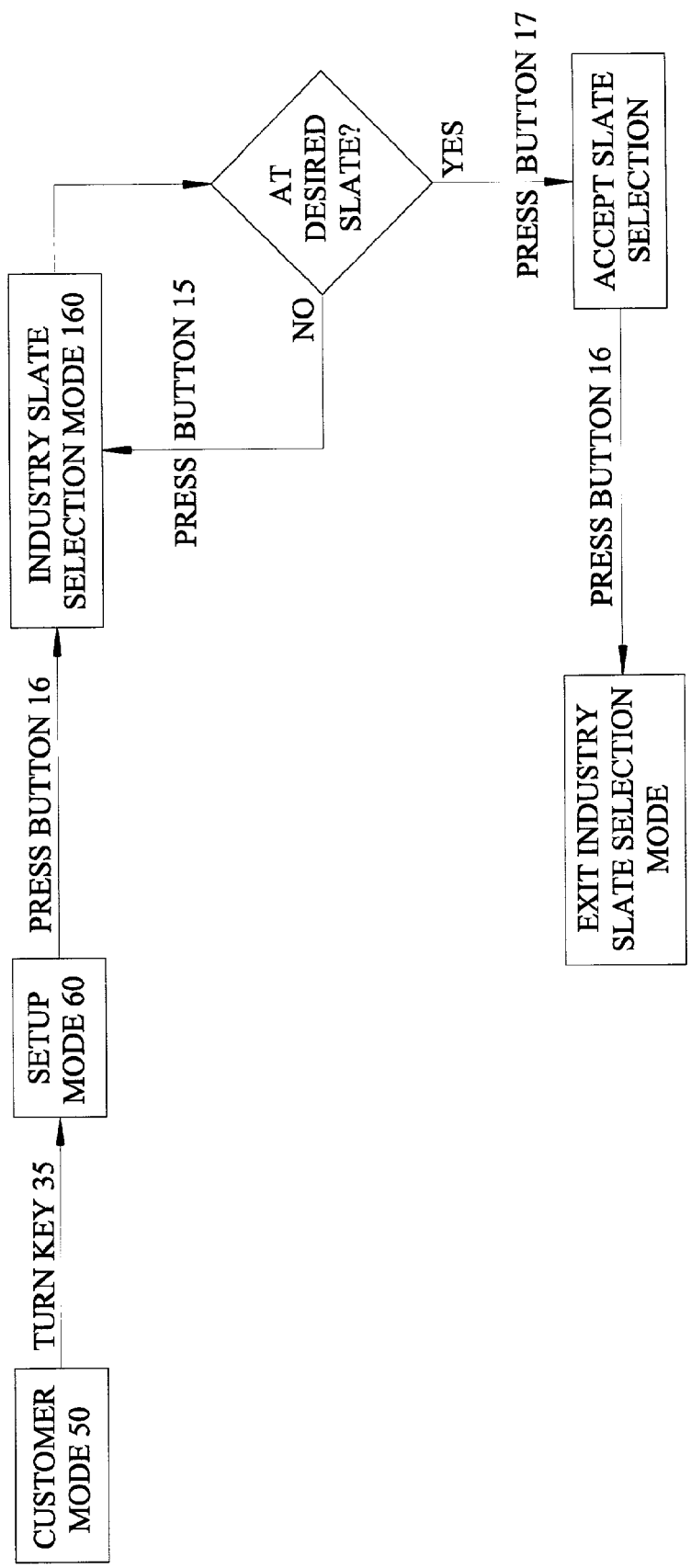
FIG. 9 is a flow-chart illustrating the steps required to select a new slate.

The procedure for selecting a new slate to be used by washing machine 1 is represented in FIG. 9. Specifically, from customer mode 50, a programmer shifts key 35 to change CPU 20 to setup mode 61. From setup mode 61 (FIG. 3), pressing button 16 moves CPU 20 into industry slate selection mode 160 (FIG. 7A). Pressing button 15 selects the next slate. If the programmer wishes the new slate to be adopted as the current slate, he presses button 17 to accept the new slate. If, however, the programmer wishes to select a different slate, he repeatedly presses button 15, until he reaches the correct slate before adopting it. Display 10 shows the number of the new slate to aid the programmer in choosing a desired slate to be used.

Figure 10:
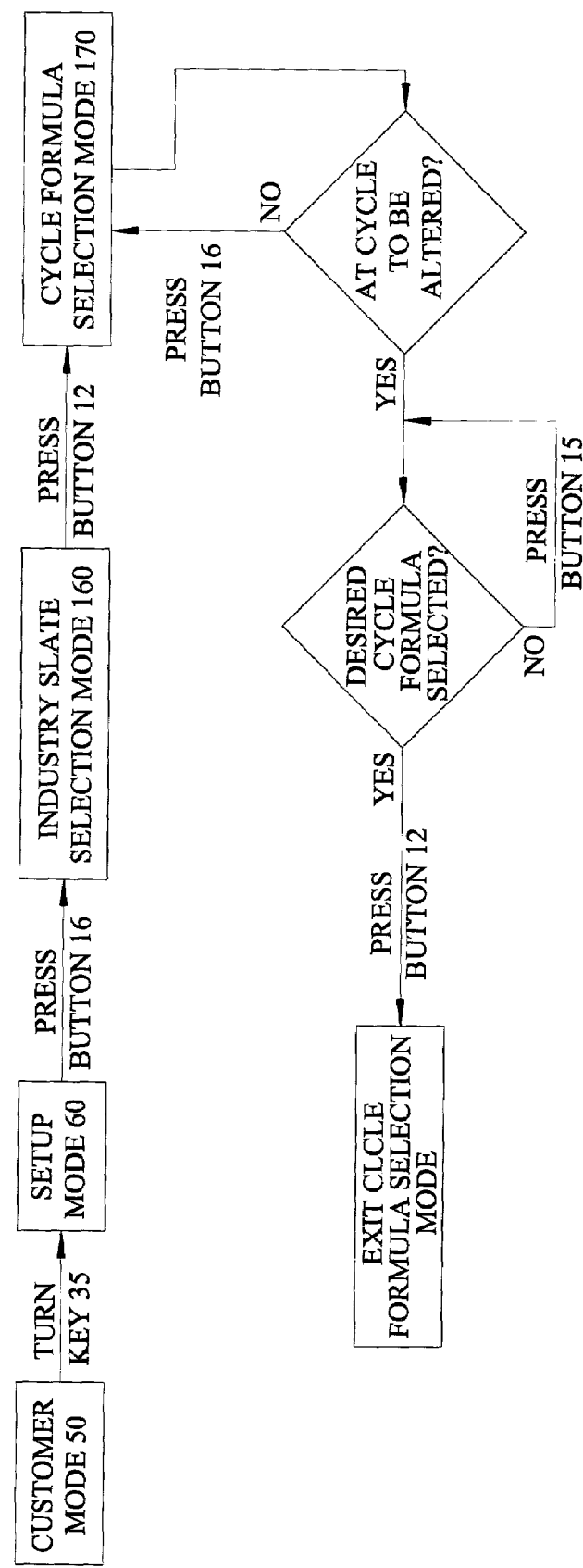
FIG. 10 is a flow-chart showing the steps used to reconfigure the selected slate with existing cycles.

On a second programming level, generally represented in FIG. 10, once CPU 20 is placed in industry slate selection mode 160, the programmer can also replace cycles present in the current slate. From mode 160 (FIG. 7A), button 12 is used to enter cycle formula selection mode 170, in which substituting a pre-defined cycle is permitted. As exemplified in FIG. 7B, button 16 is used to advance through the six cycles programmed into the current slate. Once the programmer selects the cycle he wishes to replace, button 15 is then used to select from among all of the available program cycles (formulas). Button 12 is utilized to return to industry slate selection mode 160. Again, FIG. 10 is a flowchart diagramming the above described procedure.

Figure 11:
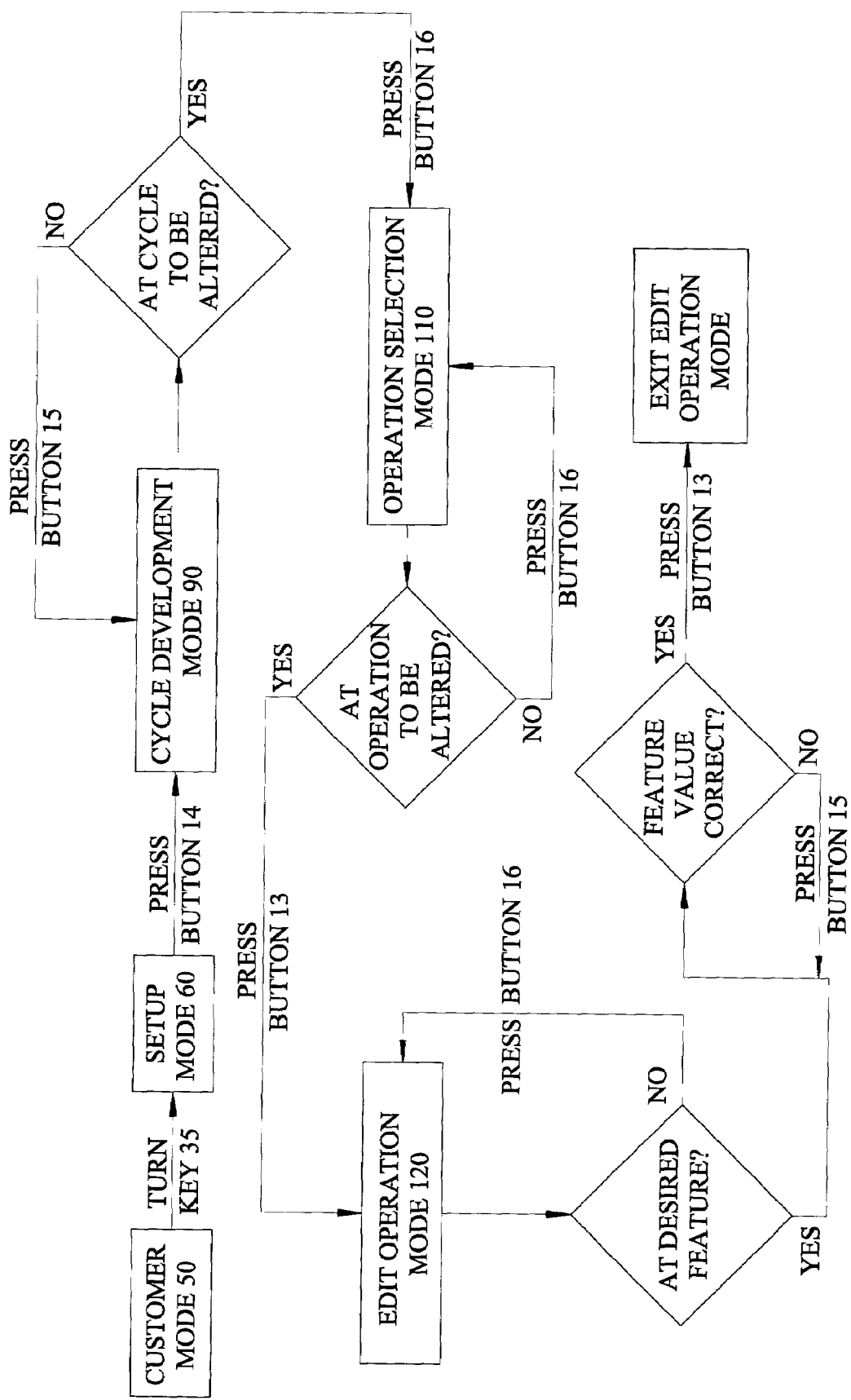
FIG. 11 is a flow-chart showing the steps required to redefine a cycle, as part of the selected slate.

On a third programming level, as represented in the flowchart of FIG. 11, the programmer may wish to redefine or edit a cycle by altering the pre-programmed steps therein. This can be accomplished via other menus of CPU 20. Specifically, from customer mode 50, key 35 is activated to change into setup mode 61. Button 14 is used to move into cycle development mode 90. Once in cycle development mode 90, the specific cycle to be altered is chosen through button 15. The programmer then enters operation selection mode 110 by pressing button 16. Button 16 is then used to identify the exact operation which is to be altered. Pressing button 13 at this stage moves CPU 20 into edit operation mode 120, where the function of the step is redefined. Button 15 is then repeatedly used to choose the new value of a feature. By pressing button 16, the programmer is given the ability to edit other features of the same operational step. When finished, the programmer can exit edit operation mode 120 by pressing button 13. The following tables illustrate a preferred combination of pre-programmed cycles, along with their operations, which may be chosen by the programmer upon installation of washing machine 1:

TABLE 11

CYCLE 1: White Sheets

| Step | Operation. | Wash Minutes | Temp. | Fill Level | Dispense |
|---|---|---|---|---|---|
| 1 | Washing with suds | 8 | Hot | Low | Detergent |
| 2 | Washing with Bleach | 8 | Hot | Low | Bleach |
| 3 | Rinse | 3 | Warm | High | — |
| 4 | Rinse | 3 | Warm | High | — |
| 5 | Rinse with softener | 5 | Cold | Low | Softener |
| 6 | Final Spin | — | — | — | — |

TABLE 12

CYCLE 2: White Towels

| Step | Operation. | Wash Minutes | Temp. | Fill Level | Dispense |
|---|---|---|---|---|---|
| 1 | Washing with suds | 8 | Hot | Low | Detergent |
| 2 | Washing with Bleach | 8 | Hot | Low | Bleach |
| 3 | Rinse | 3 | Warm | High | — |
| 4 | Rinse | 3 | Warm | High | — |
| 5 | Rinse with softener | 5 | Cold | Low | Softener |
| 6 | Final Spin | — | — | — | — |

TABLE 13

CYCLE 3: Combination White, Colored Sheets and Towels

| Step | Operation. | Wash Minutes | Temp. | Fill Level | Dispense |
|---|---|---|---|---|---|
| 1 | Washing with suds | 8 | Hot | Low | Detergent |
| 2 | Rinse | 3 | Warm | High | — |
| 3 | Rinse | 3 | Warm | High | — |
| 4 | Rinse | 3 | Warm | High | — |
| 5 | Rinse with softener | 5 | Cold | Low | Softener |
| 6 | Final Spin | — | — | — | — |

TABLE 14

CYCLE 4: Rags and Mops

| Step | Operation. | Wash Minutes | Temp. | Fill Level | Dispense |
|---|---|---|---|---|---|
| 1 | Flush | 4 | Warm | High | — |
| 2 | Flush | 3 | Warm | High | — |
| 3 | Washing with suds | 6 | Hot | Low | Detergent |
| 4 | Washing with suds | 8 | Hot | Low | Detergent |
| 5 | Rinse | 3 | Hot | High | — |
| 6 | Washing with bleach | 8 | Hot | Low | Bleach |
| 7 | Rinse | 3 | Warm | High | — |
| 8 | Rinse | 3 | Cold | High | — |
| 9 | Final Spin | — | — | — | — |

TABLE 15

CYCLE 5: Delicate

| Step | Operation. | Wash Minutes | Temp. | Fill Level | Dispense |
|---|---|---|---|---|---|
| 1 | Washing with suds | 8 | Warm | High | Detergent |
| 2 | Rinse | 3 | Warm | High | — |
| 3 | Rinse | 3 | Warm | High | — |
| 4 | Rinse | 3 | Warm | High | — |
| 5 | Rinse with softener | 5 | Cold | Low | Softener |
| 6 | Final Spin | — | — | — | — |

TABLE 16

CYCLE 6: Stain Treatment

| Step | Operation. | Wash Minutes | Temp. | Fill Level | Dispense |
|---|---|---|---|---|---|
| 1 | Washing with suds | 15 | Hot | Low | Detergent |
| 2 | Carryover | 13 | Hot | Low | — |
| 3 | Carryover | 3 | Hot | Low | — |
| 4 | Rinse | 3 | Hot | High | — |
| 5 | Rinse | 3 | Warm | High | — |
| 6 | Rinse | 3 | Warm | High | — |
| 7 | Rinse | 3 | Cold | High | — |
| 8 | Final Spin | — | — | — | — |

TABLE 17

CYCLE 7: Cotton or Blended White Table Linen

| Step | Operation. | Wash Minutes | Temp. | Fill Level | Dispense |
|---|---|---|---|---|---|
| 1 | Flush | 3 | Warm | High | — |
| 2 | Washing with suds | 11 | Hot | Low | Detergent |
| 3 | Rinse | 3 | Hot | High | — |

TABLE 17-continued

CYCLE 7: Cotton or Blended White Table Linen

| Step | Operation. | Wash Minutes | Temp. | Fill Level | Dispense |
|---|---|---|---|---|---|
| 4 | Washing with bleach | 8 | Hot | Low | Bleach |
| 5 | Rinse | 3 | Warm | High | — |
| 6 | Rinse | 3 | Warm | High | — |
| 7 | Rinse with softener | 5 | Cold | Low | Softener |
| 8 | Final Spin | — | — | — | — |

TABLE 18

CYCLE 8: Cotton or Blended Colored Table Linen

| Step | Operation. | Wash Minutes | Temp. | Fill Level | Dispense |
|---|---|---|---|---|---|
| 1 | Flush | 3 | Warm | High | — |
| 2 | Washing with suds | 11 | Hot | Low | Detergent |
| 3 | Wash with bleach | 8 | Hot | Low | Bleach |
| 4 | Rinse | 3 | Warm | High | — |
| 5 | Rinse | 3 | Warm | High | — |
| 6 | Rinse with softener | 5 | Cold | Low | Softener |
| 7 | Final Spin | — | — | — | — |

TABLE 19

CYCLE 9: 100% Polyester White Table Linen

| Step | Operation. | Wash Minutes | Temp. | Fill Level | Dispense |
|---|---|---|---|---|---|
| 1 | Flush | 3 | Warm | High | — |
| 2 | Washing with suds | 11 | Hot | Low | Detergent |
| 3 | Wash with bleach | 8 | Hot | Low | Bleach |
| 4 | Rinse | 3 | Warm | High | — |
| 5 | Rinse | 3 | Warm | High | — |
| 6 | Rinse with softener | 5 | Cold | Low | Softener |
| 7 | Final Spin | — | — | — | — |

TABLE 20

CYCLE 10: 100% Polyester Colored Table Linen

| Step | Operation. | Wash Minutes | Temp. | Fill Level | Dispense |
|---|---|---|---|---|---|
| 1 | Flush | 3 | Warm | High | — |
| 2 | Washing with suds and bleach | 11 | Hot | Low | Detergent & Bleach |
| 3 | Rinse | 3 | Hot | High | — |
| 4 | Rinse | 3 | Warm | High | — |
| 5 | Rinse | 3 | Warm | High | — |
| 6 | Rinse with softener | 5 | Cold | Low | Softener |
| 7 | Final Spin | — | — | — | — |

TABLE 21

CYCLE 11: Health Care Sheets and Towels

| Step | Operation. | Wash Minutes | Temp. | Fill Level | Dispense |
|---|---|---|---|---|---|
| 1 | Flush | 3 | Warm | High | — |
| 2 | Washing with suds | 8 | Hot | Low | Detergent |
| 3 | Wash with bleach | 8 | Hot | Low | Bleach |
| 4 | Rinse | 3 | Warm | High | — |
| 5 | Rinse | 3 | Warm | High | — |
| 6 | Rinse with softener | 5 | Cold | Low | Softener |
| 7 | Final Spin | — | — | — | — |

TABLE 22

CYCLE 12: Diapers

| Step | Operation. | Wash Minutes | Temp. | Fill Level | Dispense |
|---|---|---|---|---|---|
| 1 | Flush | 4 | Warm | High | — |
| 2 | Flush | 3 | Warm | High | — |
| 3 | Flush | 3 | Warm | High | — |
| 4 | Washing with suds | 8 | Hot | Low | Detergent |
| 5 | Rinse | 3 | Warm | High | — |
| 6 | Washing with bleach | 8 | Hot | Low | Bleach |
| 7 | Rinse | 3 | Warm | High | — |
| 8 | Rinse | 3 | Warm | High | — |
| 9 | Rinse with softener | 5 | Cold | Low | Softener |
| 10 | Final Spin | — | — | — | — |

TABLE 23

CYCLE 13: Health Care Light Soil Sheets and Towels

| Step | Operation. | Wash Minutes | Temp. | Fill Level | Dispense |
|---|---|---|---|---|---|
| 1 | Flush | 3 | Warm | High | — |
| 2 | Washing with suds and bleach | 8 | Hot | Low | Detergent & Bleach |
| 3 | Rinse | 3 | Hot | High | — |
| 4 | Rinse | 3 | Warm | High | — |
| 5 | Rinse | 3 | Warm | High | — |
| 6 | Rinse with softener | 5 | Cold | Low | Softener |
| 7 | Final Spin | — | — | — | — |

TABLE 24

CYCLE 14: Fast Food Medium Towels

| Step | Operation. | Wash Minutes | Temp. | Fill Level | Dispense |
|---|---|---|---|---|---|
| 1 | Washing with suds | 8 | Hot | Low | Detergent |
| 2 | Wash with bleach | 8 | Hot | Low | Bleach |
| 3 | Rinse | 3 | Hot | High | — |
| 4 | Rinse | 3 | Hot | High | — |
| 5 | Rinse | 3 | Cold | High | — |
| 6 | Final Spin | — | — | — | — |

TABLE 25

CYCLE 15: Fast Food Heavy Towels

| Step | Operation. | Wash Minutes | Temp. | Fill Level | Dispense |
|---|---|---|---|---|---|
| 1 | Washing with suds | 8 | Hot | Low | Detergent |
| 2 | Washing with suds | 11 | Hot | Low | Detergent |
| 3 | Rinse | 3 | Hot | High | — |
| 4 | Washing with bleach | 8 | Hot | Low | Bleach |
| 5 | Rinse | 3 | Hot | High | — |
| 6 | Rinse | 3 | Hot | High | — |

TABLE 25-continued

CYCLE 15: Fast Food Heavy Towels

| Step | Operation. | Wash Minutes | Temp. | Fill Level | Dispense |
|---|---|---|---|---|---|
| 7 | Rinse | 3 | Cold | High | — |
| 8 | Final Spin | — | — | — | — |

TABLE 26

CYCLE 16: Fast Food Medium Soil Uniforms

| Step | Operation. | Wash Minutes | Temp. | Fill Level | Dispense |
|---|---|---|---|---|---|
| 1 | Washing with suds and bleach | 8 | Hot | Low | Detergent & Bleach |
| 2 | Rinse | 3 | Hot | High | — |
| 3 | Rinse | 3 | Warm | High | — |
| 4 | Rinse | 3 | Warm | High | — |
| 5 | Rinse with softener | 5 | Cold | Low | Softener |
| 6 | Final Spin | — | — | — | — |

TABLE 27

CYCLE 17: Fast Food Heavy Soiled Uniforms

| Step | Operation. | Wash Minutes | Temp. | Fill Level | Dispense |
|---|---|---|---|---|---|
| 1 | Washing with suds | 6 | Hot | Low | Detergent |
| 2 | Washing with suds and bleach | 11 | Hot | Low | Detergent & Bleach |
| 3 | Rinse | 3 | Hot | High | — |
| 4 | Rinse | 3 | Hot | High | — |
| 5 | Rinse | 3 | Warm | High | — |
| 6 | Rinse with softener | 5 | Cold | Low | Softener |
| 7 | Final Spin | — | — | — | — |

TABLE 28

CYCLE 18: Light to Medium Soil Sports Uniforms, Gym Clothes and Towels

| Step | Operation. | Wash Minutes | Temp. | Fill Level | Dispense |
|---|---|---|---|---|---|
| 1 | Washing with suds | 8 | Hot | Low | Detergent |
| 2 | Washing with suds and bleach | 8 | Hot | Low | Detergent & Bleach |
| 3 | Rinse | 3 | Hot | High | — |
| 4 | Rinse | 3 | Warm | High | — |
| 5 | Rinse | 3 | Warm | High | — |
| 6 | Rinse with softener | 5 | Cold | Low | Softener |
| 7 | Final Spin | — | — | — | — |

TABLE 29

CYCLE 19: Heavy Soil Baseball, Football, Soccer

| Step | Operation. | Wash Minutes | Temp. | Fill Level | Dispense |
|---|---|---|---|---|---|
| 1 | Washing with suds | 11 | Hot | Low | Detergent |
| 2 | Washing with suds and bleach | 12 | Hot | Low | Detergent & Bleach |
| 3 | Carryover | 4 | Hot | Low | — |
| 4 | Rinse | 3 | Hot | High | — |
| 5 | Rinse | 3 | Warm | High | — |
| 6 | Rinse | 3 | Warm | High | — |

TABLE 29-continued

CYCLE 19: Heavy Soil Baseball, Football, Soccer

| Step | Operation. | Wash Minutes | Temp. | Fill Level | Dispense |
|---|---|---|---|---|---|
| 7 | Rinse with softener | 5 | Cold | Low | Softener |
| 8 | Final Spin | — | — | — | — |

TABLE 30

CYCLE 20: Cold Wash Basketball and Delicate

| Step | Operation. | Wash Minutes | Temp. | Fill Level | Dispense |
|---|---|---|---|---|---|
| 1 | Washing with suds | 11 | Cold | Low | Detergent |
| 2 | Rinse | 3 | Cold | High | — |
| 3 | Rinse | 3 | Cold | High | — |
| 4 | Rinse | 3 | Cold | High | — |
| 5 | Rinse with sour | 5 | Cold | Low | Softener |
| 6 | Final Spin | — | — | — | — |

TABLE 31

CYCLE 21: Towels with Hair

| Step | Operation. | Wash Minutes | Temp. | Fill Level | Dispense |
|---|---|---|---|---|---|
| 1 | Washing with suds | 6 | Hot | Low | Detergent |
| 2 | Rinse | 3 | Hot | High | — |
| 3 | Rinse | 3 | Hot | High | — |
| 4 | Washing with suds | 8 | Hot | Low | Detergent |
| 5 | Rinse | 3 | Hot | High | — |
| 6 | Washing with bleach | 8 | Hot | Low | Bleach |
| 7 | Rinse | 3 | Warm | High | — |
| 8 | Rinse | 3 | Warm | High | — |
| 9 | Rinse with softener | 5 | Cold | Low | Softener |
| 10 | Final Spin | — | — | — | — |

TABLE 32

CYCLE 22: Hot Wash Shirts

| Step | Operation. | Wash Minutes | Temp. | Fill Level | Dispense |
|---|---|---|---|---|---|
| 1 | Washing with suds and bleach | 13 | Hot | Low | Detergent & Bleach |
| 2 | Carryover | 3 | Hot | Low | — |
| 3 | Rinse | 3 | Hot | High | — |
| 4 | Rinse | 3 | Warm | High | — |
| 5 | Rinse | 3 | Warm | High | — |
| 6 | Rinse | 3 | Cold | High | — |
| 7 | Final Spin | — | — | — | — |

TABLE 33

CYCLE 23: Warm Wash Shirts

| Step | Operation. | Wash Minutes | Temp. | Fill Level | Dispense |
|---|---|---|---|---|---|
| 1 | Washing with suds and bleach | 13 | Warm | Low | Detergent & Bleach |
| 2 | Carryover | 3 | Warm | Low | — |
| 3 | Rinse | 3 | Warm | High | — |
| 4 | Rinse | 3 | Warm | High | — |
| 5 | Rinse | 3 | Warm | High | — |

TABLE 33-continued

CYCLE 23: Warm Wash Shirts

| Step | Operation. | Wash Minutes | Temp. | Fill Level | Dispense |
|---|---|---|---|---|---|
| 6 | Rinse | 3 | Cold | High | — |
| 7 | Final Spin | — | — | — | — |

TABLE 34

CYCLE 24: Cold Wash Shirts

| Step | Operation. | Wash Minutes | Temp. | Fill Level | Dispense |
|---|---|---|---|---|---|
| 1 | Washing with suds and bleach | 13 | Cold | Low | Detergent & Bleach |
| 2 | Carryover | 3 | Cold | Low | — |
| 3 | Rinse | 3 | Cold | High | — |
| 4 | Rinse | 3 | Cold | High | — |
| 5 | Rinse | 3 | Cold | High | — |
| 6 | Rinse | 3 | Cold | High | — |
| 7 | Final Spin | — | — | — | — |

TABLE 35

CYCLE 25: Shirts - Starch Only

| Step | Operation. | Wash Minutes | Temp. | Fill Level | Dispense |
|---|---|---|---|---|---|
| 1 | Washing with starch | 8 | Cold | Low | Softener |
| 2 | Final Spin | — | — | — | — |

TABLE 36

CYCLE 26: Hot Wash Shirts with Starch

| Step | Operation. | Wash Minutes | Temp. | Fill Level | Dispense |
|---|---|---|---|---|---|
| 1 | Washing with suds and bleach | 13 | Hot | Low | Detergent & Bleach |
| 2 | Carryover | 3 | Hot | Low | — |
| 3 | Rinse | 3 | Hot | High | — |
| 4 | Rinse | 3 | Warm | High | — |
| 5 | Rinse | 3 | Warm | High | — |
| 6 | Rinse | 3 | Warm | High | — |
| 7 | Washing with starch | 8 | Cold | Low | Softener |
| 8 | Final Spin | — | — | — | — |

TABLE 37

CYCLE 27: Warm Wash Shirts with Starch

| Step | Operation. | Wash Minutes | Temp. | Fill Level | Dispense |
|---|---|---|---|---|---|
| 1 | Washing with suds and bleach | 13 | Warm | Low | Detergent & Bleach |
| 2 | Carryover | 3 | Warm | Low | — |
| 3 | Rinse | 3 | Warm | High | — |
| 4 | Rinse | 3 | Warm | High | — |
| 5 | Rinse | 3 | Warm | High | — |
| 6 | Rinse | 3 | Warm | High | — |
| 7 | Washing with starch | 8 | Cold | Low | Softener |
| 8 | Final Spin | — | — | — | — |

TABLE 38

CYCLE 28: Whites

| Step | Operation. | Wash Minutes | Temp. | Fill Level | Dispense |
|---|---|---|---|---|---|
| 1 | Washing with suds | 11 | Hot | Low | Detergent |
| 2 | Carryover | 3 | Hot | Low | Bleach |
| 3 | Rinse | 2 | Cold | High | — |
| 4 | Rinse | 2 | Cold | High | — |
| 5 | Rinse with softener | 3 | Cold | High | Softener |
| 6 | Final Spin | — | — | — | — |

TABLE 39

CYCLE 29: Colors

| Step | Operation. | Wash Minutes | Temp. | Fill Level | Dispense |
|---|---|---|---|---|---|
| 1 | Washing with suds | 11 | Warm | Low | Detergent |
| 2 | Carryover | 3 | Warm | Low | Bleach |
| 3 | Rinse | 2 | Cold | High | — |
| 4 | Rinse | 2 | Cold | High | — |
| 5 | Rinse with softener | 3 | Cold | High | Softener |
| 6 | Final Spin | — | — | — | — |

TABLE 40

CYCLE 30: Bright Colors

| Step | Operation. | Wash Minutes | Temp. | Fill Level | Dispense |
|---|---|---|---|---|---|
| 1 | Washing with suds | 11 | Cold | Low | Detergent |
| 2 | Carryover | 3 | Cold | Low | Bleach |
| 3 | Rinse | 2 | Cold | High | — |
| 4 | Rinse | 2 | Cold | High | — |
| 5 | Rinse with softener | 3 | Cold | High | Softener |
| 6 | Final Spin | — | — | — | — |

TABLE 41

CYCLE 31: Permanent Press

| Step | Operation. | Wash Minutes | Temp. | Fill Level | Dispense |
|---|---|---|---|---|---|
| 1 | Washing with suds | 11 | Warm | Low | Detergent |
| 2 | Carryover | 3 | Warm | Low | Bleach |
| 3 | Rinse | 2 | Cold | High | — |
| 4 | Rinse | 2 | Cold | High | — |
| 5 | Rinse with softener | 3 | Cold | High | Softener |
| 6 | Final Spin | — | — | — | — |

TABLE 42

CYCLE 32: Woolens

| Step | Operation. | Wash Minutes | Temp. | Fill Level | Dispense |
|---|---|---|---|---|---|
| 1 | Washing with suds | 11 | Cold | Low | Detergent |
| 2 | Carryover | 3 | Cold | Low | Bleach |
| 3 | Rinse | 2 | Cold | High | — |
| 4 | Rinse | 2 | Cold | High | — |
| 5 | Rinse with softener | 3 | Cold | High | Softener |
| 6 | Final Spin | — | — | — | — |

TABLE 43

CYCLE 33: Delicates

| Step | Operation. | Wash Minutes | Temp. | Fill Level | Dispense |
|---|---|---|---|---|---|
| 1 | Washing with suds | 11 | Warm | Low | Detergent |
| 2 | Carryover | 3 | Warm | Low | Bleach |
| 3 | Rinse | 2 | Cold | High | — |
| 4 | Rinse | 2 | Cold | High | — |
| 5 | Rinse with softener | 3 | Cold | High | Softener |
| 6 | Final Spin | — | — | — | — |

Although the above cycles are each shown as having not more than ten steps each, it is possible, via CPU 20 to have extra steps added. Additionally, a drain and spin step preferably occurs between steps except prior to a Carryover step. As can be seen from the above tables, the individual steps used in each of the cycles can be chosen from a short list of procedures, including:

TABLE 44

| | |
|---|---|
| Suds-Bleach | Bleach |
| Suds | Flush |
| Sour | Rinse |
| Sour-Softener | Carryover |
| Starch | Intermediate Extract |
| Softener | Final Extract |
| Treatment | |

Associated with each of the above-cycles is a set of operation variables. The following table illustrates the most common combination of operation variables.

TABLE 45

| Operation | Description |
|---|---|
| Tumble Speed | 47–49 rpm |
| Tumble Pattern | 7 seconds on/3 seconds pause |
| Final Spin Speed & Minutes | 800 rpm-4 minutes |
| Detergent (dispense time) | 3 seconds |
| Bleach (dispense time) | 20 seconds |
| Softener (dispense time) | 20 seconds |
| Total Run Time | 41.5-65 minutes (depending upon number and length of steps in cycle) |

From the above, it should be readily apparent that washing machine 1 is initially provided with various stored slates which enables any given machine 1 to be adapted for use in a wide range of environments. That is, a desired slate can be selected from a plurality of slates which enhances the versatility and functionality of the machine 1. In addition, each slate can be modified on various levels. Particularly, the pre-programmed cycles in one slate can be substituted for another. In addition, the operational parameters associated with any given cycle can be altered. In this way, a new slate can be established on multiple levels. In any event, although described with reference to a preferred embodiment, it should be readily understood that various changes and/or modifications could be made to the invention without departing from the spirit thereof. For instance, although FIGS. 2–11 depict preferred instruction sequences for programming washing machine 1, other sequences could be followed to perform the same functions. In general, any sequencing arrangement which gives a user the ability to (1) chose a new slate from additional slates programmed into CPU 20; (2) rebuild a slate from existing cycles present in CPU 20; and/or (3) redefine a cycle from a variety of commands would be sufficient. In addition, although described with relation to buttons 12–17, it is also within the scope of the invention to use any means to access CPU 20, e.g., a removable memory device, keyboard, touch screens or the like. Furthermore, although the invention has been described in detail with reference to providing multi-level programming of horizontal axis washing machine 1, it should be understood that the invention can also be applied to various types of laundry machines, including vertical axis washers and even clothes dryers. In any event, the invention is only intended to be limited by the scope of the following claims.

We claim:

1. A laundry appliance comprising:
a CPU;
a plurality of slates pre-programmed into said CPU, each slate including at least one cycle for operating said laundry appliance, each cycle including at least one operational parameter of said laundry appliance;
a display connected to said CPU;
means for selecting a desired slate from among said plurality of slates;
means for creating a new slate by replacing said at least one cycle with another cycle from said plurality of slates; and
means for editing said at least one operational parameter of said at least one cycle to vary an operation of said laundry appliance.

2. A laundry appliance comprising:
a CPU;
a plurality of slates programmed into said CPU, each slate including a plurality of cycles for operation said laundry appliance in a particular environment, each cycle including at least one operational parameter of said laundry appliance;
means for selecting a desired slate from among said plurality of slates; and
means for creating a new slate by replacing at least one of the plurality of cycles in one of the plurality of slates with another cycle from said plurality of slates.

3. The laundry appliance of claim 2, wherein said laundry appliance constitutes a washing machine.

4. The laundry appliance of claim 3, wherein said at least one of the plurality of cycles defines at least one operation selected from the group consisting of: filling, spinning, tumbling, draining, and dispensing.

5. The laundry appliance of claim 2, further comprising:
means for editing said at least one operational parameter of at least one of the plurality of cycles to vary an operation of said laundry appliance.

6. The laundry appliance of claim 5, further comprising:
a display connected to said CPU; and
a plurality of buttons associated with said display, each button being associated with a predetermined command, wherein said display presents informational text upon the depression of at least one of said plurality of buttons.

7. A laundry appliance comprising:
a CPU, wherein said CPU includes means for selectively establishing an operation mode and a programming mode and said means for selectively establishing comprises a security device which, when activated, changes from the operation mode to the programming mode;
a plurality of slates programmed into said CPU, each slate including a plurality of cycles for operating said laundry appliance in a particular environment, each cycle including at least one operational parameter of said laundry appliance; and means for selecting a desired slate from among said plurality of slates.

8. A laundry appliance comprising:

a CUP;

a plurality of slates programmed into said CPU, each slate including a plurality of cycles for operating said laundry appliance in a particular environment, each cycle including at least one operational parameter of said laundry appliance;

means for selecting a desired slate from among said plurality of slates; and means for editing said at least one operational parameter of at least one of the plurality of cycles to vary an operation of said laundry appliance.

9. The laundry appliance of claim 8, further comprising:

a display connected to said CPU; and a plurality of buttons associated with said display, each button being associated with a predetermined command, wherein said display presents informational text upon the depression of at least one of said plurality of buttons.

10. The laundry appliance of claim 9, wherein said CPU includes means for selectively establishing an operation mode and a programming mode.

11. The laundry appliance of claim 10, wherein said means for selectively establishing comprises a security device which, when activated, changes from the operation mode to the programming mode.

12. The laundry appliance of claim 10, wherein said buttons allow reprogramming said slates, cycles, and parameters when said CPU is in said programming mode.

13. The laundry appliance of claim 8, wherein said laundry appliance constitutes a washing machine and said at least one operational parameter is selected from the group consisting of: wash minutes, temperature, fill level, and dispensing.

14. A method of controlling a laundry appliance including a CPU and a plurality of slates programmed into said CPU, with each slate including a plurality of cycles for operating said laundry appliance and each cycle having a plurality of operational parameters, comprising:

selecting a desired slate from among said plurality of slates;

operating the laundry appliance in accordance with the desired slate selected; and creating a new slate by replacing said at least one of said plurality of cycles with another cycle from said plurality of slates.

15. The method according to claim 14, further comprising: editing said at least one of said plurality of operational parameters of said at least one of said plurality of cycles to vary an operation of said laundry appliance.

16. The method according to claim 15, further comprising: selectively establishing an operation mode and a programming mode.

17. A method of controlling a laundry appliance including a CPU and a plurality of slates programmed into said CPU, with each slate including a plurality of cycles for operating said laundry appliance and each cycle having a plurality of operational parameters, comprising:

selecting a desired slate from among said plurality of slates;

operating the laundry appliance in accordance with the desired slate selected; and editing said at least one of said plurality of operational parameters of said at least one of said plurality of cycles to vary an operation of said laundry appliance.

* * * * *